Sept. 25, 1962      G. R. KOCH      3,055,396

HYDROPNEUMATIC ACCUMULATOR

Filed May 18, 1961

INVENTOR.
GEORGE R. KOCH

BY

*Paul S. Martin*

ATTORNEY

United States Patent Office 3,055,396
Patented Sept. 25, 1962

3,055,396
HYDROPNEUMATIC ACCUMULATOR
George R. Koch, Palo Alto, Calif., assignor to Federal Pacific Electric Company, a corporation of Delaware
Filed May 18, 1961, Ser. No. 110,985
10 Claims. (Cl. 138—31)

This invention relates to hydropneumatic accumulators generally and more specifically to accumulators of the oil and gas types in which separation between the two fluids is maintained by a free piston.

Heretofore hydropneumatic accumulators have been costly to manufacture and have required a considerable amount of space. The high pressures at which the accumulators operated required thick walled vessels precision machined for adequate sealing thus resulting in a high cost device. The space requirements had been particularly troublesome in the application of accumulators to circuit breakers and other types of hydropneumatic equipment. Therefore, it is an object of this invention to provide an accumulator which is simple, inexpensive and which may be readily disposed about the equipment to which it is operatively connected or become a structural portion of the apparatus. It is another object of this invention to provide an accumulator having thin walls and which is capable of safely retaining considerable pressures. A feature of this invention resides in the provision of an accumulator having a longitudinal axis which is curved for a part of its length and a semi-flexible movable barrier capable of sealing between the gas and oil both in the straight and the curved portions of the accumulator. It is a still further object of this invention to provide a novel accumulator having a movable barrier between the gas and oil which barrier is capable of sealing the accumulator in the absence of oil to retain the gas under pressure.

The foregoing objects are achieved in an illustrative embodiment of the invention described in detail below and shown in the accompanying drawings. This embodiment includes a hydropneumatic accumulator having a substantially greater length-to-diameter ratio than those heretofore known, the accumulator comprising a length of relatively thin wall tubing, a cap closing one end of the tubing and a fluid junction fitting on the other end of the tubing for connecting the accumulator to the associated apparatus. A movable barrier, capable of separating the fluid and gas, is slidable within the tubing and has a wall engaging portion forming an annular seal and a portion for seating against the junction fitting and thereby forming a second seal.

For a better understanding of the invention, reference is made to the following description taken in conjunction with the accompanying drawings in which.

Figure 1:
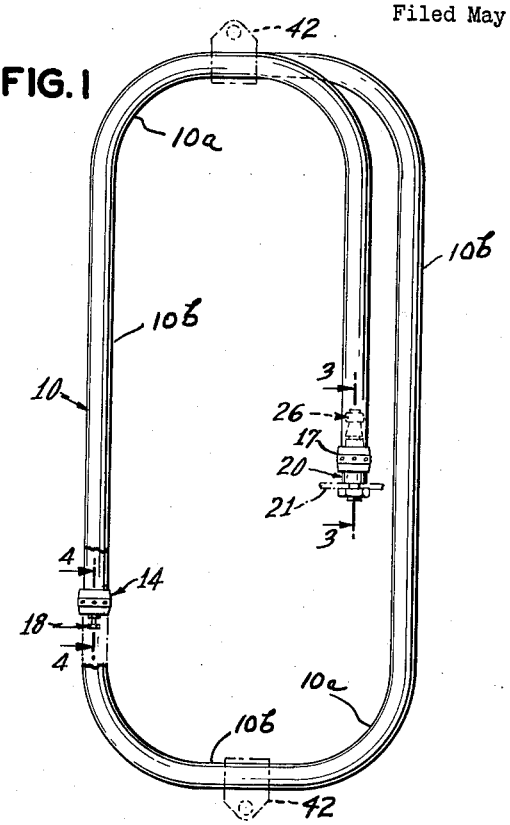
FIG. 1 is a front elevation view of a hydropneumatic accumulator illustrating one embodiment of the invention.
Figure 2:
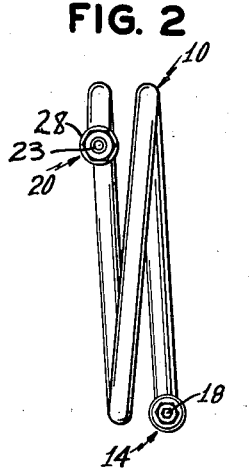
FIG. 2 is a bottom view of the accumulator FIG. 1.

Referring to the drawings, the hydropneumatic accumulator shown therein is a presently preferred embodiment of the invention and comprises a relatively long length of small diameter tubing 10 which gives a length-to-diameter ratio of at least 50 to 1. The tubing 10 has a relatively thin wall 12. Although the tubing in the illustrative embodiment is shown with its longitudinal axis bent into a generally oval-helix form other configurations are also contemplated as for example, those having smoothly curved portions 10a and straight portions 10b, or entirely curved, or entirely straight. A gas charging cap 14 is provided for introduction of the operative gas under pressure. Charging cap 14 includes a plug body 15 which extends into the end of the tubing 10 and is sealed thereto by an O-ring 16. A shoulder of plug 15 is held tight against the end of the tubing by an internally threaded member 17. A standard pneumatic valve 18 communicates to the interior of the tubing 10 through a bore 19 in the plug body 15.

End or junction fitting 20 connects the opposite end of the accumulator tubing 10 to the associated apparatus 21 indicated by phantom lines. Junction 20 comprises a plug body 22 having a bore 23. The interior end of the bore 23 has an enlarged portion 24. Hydraulic fluid or oil passes to and from the hydraulic system of apparatus 21 through the bore 23. Plug body 22 is sealed by O-ring 27 to the wall of the tubing 10. An internally threaded member 28 is threaded tight on the end of tubing 10 and plug 22 is tightened in member 28 against the edge of tubing 10. The junction cap 20 is provided with a shoulder or seat 29 at the inner end of bore portion 24.

Figure 5:
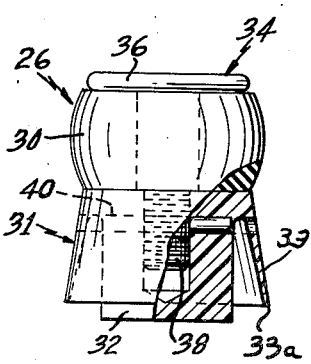
FIG. 5 is an enlarged side view in partial section of a presently preferred embodiment of the movable barrier shown in phantom in FIG. 1.
Figure 3:
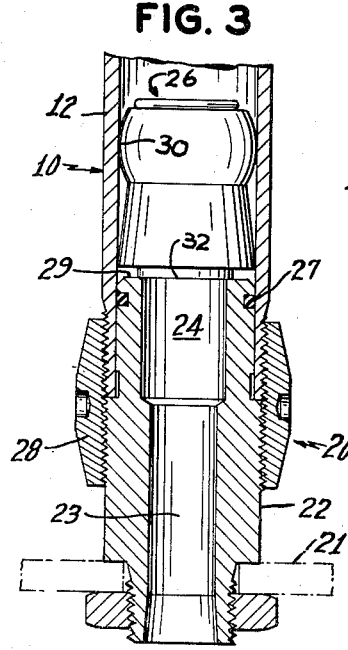
FIG. 3 is an enlarged side view in section of the junction fitting between the accumulator and the associated apparatus taken along the line 3—3 of FIG. 1.
Figure 4:
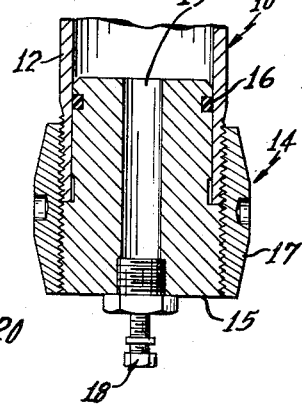
FIG. 4 is an enlarged side view in section of the accumulator charging cap taken along the line 4—4 of FIG. 1.

The movable barrier 26, which separates the fluid and gas, includes a moving seal portion 30 and is shown in FIG. 5 as having the form of a torus 30 of resilient material. The moving seal 30 engages the interior surface of the tubing wall 12 and is sufficiently resilient to accommodate itself to deviations in the circular bore of the tubing 10 as it passes through the curved portions 10a. Advantageously the portion 30 is in the form of a spherical zone with parallel-plane ends and a central bore. It will be understood that the tubing has a smooth circular wall in the straight lengths but that the bore of the tubing is slightly oval in the curved regions as an inherent effect of the bending process. In the presently preferred embodiment the torus 30 is fabricated from hydraulic fluid resisting material, such as Buna "S" rubber, having a resilience of 40 Duro.

The movable barrier 26 has a guide portion or follower 31 which serves to prevent cocking of the moving seal 30 as the assembly 26 passes around the curved portion 10a of the tubing. The follower 31 has a central endwise projecting shoulder 32 and a skirt 33 which has a peripheral depending edge 33a. The diameter of the shoulder 32 is greater than the diameter of the bore 24 in the junction 20 but is smaller than the diameter of the skirt edge 33a. Skirt 33a is flexible and exerts centering force on the barrier 26 in the tubing. The torus 30 and follower 31 are tightly held together by a bolt 34 having a relatively broad thin head 36 and the torus and follower are thus sealed to each other. The under side of the head 36 is sealed tight against the torus 30. The shank 38 of the bolt 34 is threaded into the follower 31. Pin 40 which passes through the follower and the bolt prevents the assembly from becoming loose. The follower 31 is fabricated, in the presently preferred embodiment, from hydraulic fluid-resistant resilient material of considerable stiffness as compared to that of portion 30. Nylon has been found to have characteristics which are desirable for this purpose.

The accumulator may be positioned on the associated apparatus by brackets 42 indicated by phantom lines in FIG. 1 or it may be entirely self supporting.

In a practical example of the apparatus shown in the drawings, the tubing 10 of the accumulator is approximately twenty feet long and has an inner diameter of one and a half inches, giving a length-to-diameter ratio of 160:1. The high $L/D$ ratio allows use of thin walled tubing since the unit stress for the greater interior surface area is much lower. It has been found that $L/D$ ratios of at least 50:1 are beneficial in that they allow the use of tubing having thin walls at pressures in the neighborhood of 1500 to 2800 p.s.i. The small diameter of the end cap 14 and junction 20 reduces the endwise stress or force on the tubing since the force is proportional to the square of the diameter of the closure. A practical example of the illustrative accumulator is fabricated from cold drawn welded steel tubing 10 having a wall 12 thickness of 1/8" for a maximum operating pressure of 2800 pounds per square inch and a nominal operating pressure of 1500 pounds per square inch. The curved sections have a radius of about 8½" to the axis of the tubing.

The non-cocking semi-flexible piston assembly 26 allows tubing 10 to be bent to conform to the apparatus 21 with which it is employed, and thus become an integrated structural portion of such apparatus. In the illustrated embodiment the tubing 10 has been formed into a helix of approximately one-and-a-half turns having curved parts 10a and straight parts 10b. The barrier or piston assembly 26 negotiates the curves 10a without becoming cocked or jammed and the main seal 30 of the piston 26 is kept transverse the tubing 10 by the pressure of the skirt 33 of the follower 31 against the wall of the tubing. The diameter of the resilient circumferentially continuous skirt 33 at its dependent edge 33a is equal to, or substantially the same as, the inner diameter of the tubing 10 and since the thin edge 33a is resilient it is able to follow the contour of the inner surface of the tubing as the piston assembly travels around the curves 10a. The skirt 33 exerts a dependable centering effect against the shank of bolt 34 and prevents cocking of the piston assembly 26.

When the fluid pressure in the accumulator fluctuates, the movable barrier 26 travels from one position to another within the tubing. The piston 26 is subjected only to relatively minor pressure differentials during normal operation and, being a free piston, adjusts its position to eliminate such differentials. The small mass of piston 26 results in a high rate of response to relatively small pressure differentials. A typical operating stroke of the piston in the illustrative embodiment as used in operating a circuit breaker is approximately 10 feet. Although this is a considerable distance for a piston to travel, little wear occurs because of the nature of the materials that can be used in this construction and because the sealing pressure against the side wall 12 need not be high in order to withstand the slight pressure differentials which occur across it. The seal 30 is resilient and accommodates itself to the moderately out-of-round parts of the accumulator such as those encountered in the curved portions 10a of the tubing. The ability of the seal to conform to variations in diameter prevents gas-fluid mixing from occuring, and prevents the exposure of the pressure gas to the oil and thereby prevents absorption of gas in the oil.

A further important feature of the illustrated accumulator is the co-action of the guide shoulder 32 with seat 29 formed on the junction body 22. Shoulder 32 and seat 29 form a tight seal to prevent escape of the gas in the event of loss of hydraulic pressure. When the hydraulic pressure drops the piston travels to the junction 20 and the shoulder 32 is intercepted by the seat 29. A small quantity of oil remains between the moving seal 30 and the end seal formed by the shoulder 32 and seat 29 so that there is normally no large pressure differential across the moving seal 30 of the piston 26 even when the hydraulic apparatus is disconnected. Assuming that the seal of shoulder 32 against seat 29 seal does not leak there is a force of same 900 pounds pushing the nylon follower 31 against the junction fitting 22 in an accumulater having the dimensions above. This force is proportional to the cross sectional area of the bore 24 and the precharge gas pressure. In this case the bore 24 is 7/8 inch in diameter, the diameter of shoulder 32 is one inch, and the precharge pressure is 1500 p.s.i. The force generated at the shoulder-seat seal is sufficient to cause the nylon shoulder 32 to flow resiliently to fill in any minor irregularities in the seat 29, but the nylon is stiff enough to retain the apparent configuration illustrated.

In the event that there should be any tendency for the shoulder-seat seal to leak, the 1500 p.s.i. gas pressure would act on the whole cross-sectional area of the piston (measured at the moving seal) thereby producing a force of about 2700 pounds tending to effect a better seal between the shoulder and seat if it is assumed that the moving seal does not leak. Under that condition the entire force of the gas acting on the moving seal 30 would be applied to shoulder-seat seal. As a practical matter, the nylon shoulder 32 does seal reliably against the seat 29. This end seal is called upon to function only during periods of shipment, maintenance, or the occurrence of an extreme loss of hydraulic pressure. Normally there is a substantial hydraulic pressure to oppose the pneumatic pressure, the nylon and seal being relieved of pressure so long as the accumulator is in operative relation to the equipment operated thereby.

The novel accumulator herein before described may be shaped to conform to random available space in the apparatus with which it is employed. In this manner the novel accumulator avoids allocation of a particular localized volume in the apparatus to receive the accumulator, such as is required when known forms of accumulators are used. The novel accumulator may be formed in approximately the same outline as the frame of the equipment in which it is used, with curved portions and straight portions as required. The novel free piston is capable of traveling through curved portions of the accumulator while maintaining separation of fluid and gas.

It will be apparent to those skilled in the art that various changes and modifications may be made without departing from the spirit of the invention.

What I claim is:

1. A free piston hydropneumatic accumulator comprising a length of tubing having a length-to-diameter ratio of at least 50 to 1, a closure at one end of said tubing, a junction fitting at the other end of said tubing, and a free piston having resilient material forming an annular seal to the wall of the tubing for separating the gas and fluid within said tubing.

2. A free piston hydropneumatic accumulator comprising a length of tubing, at least portions of the length being curved, a closure at one end of said tubing, a junction fitting at the other end of said tubing, and a free piston having a resilient seal of limited axial extent engaging the inside surface of the tubing separating the gas and fluid within said tubing and movable intermediate the ends thereof.

3. A free piston hydropneumatic accumulator comprising a length of tubing having a length to diameter ratio at least 50 to 1, a closure at one end of said tubing, a junction fitting at the other end of said tubing, a free piston for separating the gas and fluid within said tubing and movable intermediate the ends thereof, said piston forming a moving circumferential seal within said tubing for separating gas and fluid and forming an end seal with said junction fitting to prevent escape of the gas from said tubing when said fluid is discharged from said tubing.

4. A free piston hydropneumatic accumulator comprising a length of tubing, a closure at one end of said tubing, a junction fitting at the other end of said tubing, a free piston for separating the gas and fluid within said tubing and movable intermediate the ends thereof, said piston having a resilient body portion forming a moving circumferential seal of limited axial extent within said tubing for separating gas and fluid, and said piston having a follower portion of thin-walled resilient material in lateral engagement with the inside surface of the tubing for maintaining a predetermined attitude of said body portion in said tubing as the piston moves therein.

5. A free piston hydropneumatic accumulator comprising a length of tubing, a closure at one end of said tubing, a junction fitting at the other end of said tubing, a free piston for separating the gas and fluid within said tubing and movable intermediate the ends thereof, said piston having a resilient body portion forming a moving circumferential seal of limited axial extent within said tubing for separating gas and fluid, and said piston having a follower portion of thin-walled resilient material in lateral engagement with the inside surface of the tubing for maintaining a predetermined attitude of said body portion in said tubing as the piston moves therein, said follower portion additionally including an end projection of resilient material that is stiff compared to said body portion adapted to engage said junction fitting and constitute a continuous circular end seal of limited radial extent.

6. A free piston hydropneumatic accumulator in accordance with claim 5 wherein said body portion is synthetic rubber and wherein said follower portion and said end projection are of nylon.

7. A free piston hydropneumatic accumulator comprising a body portion of tubing having a length to diameter ratio at least 50 to 1, a closure at one end of said body portion, a junction fitting at the other end of said body portion, a free piston for separating the gas and fluid within said body portion and movable intermediate the ends thereof, said piston forming a moving seal within said body portion for separating gas and fluid and forming an end seal with said junction fitting to prevent escape of the gas from said body when said fluid is discharged from said body, said piston comprising a sealing member of resilient material having a spherical portion for contacting said body and a resilient follower portion extending from said spherical portion, said spherical portion forming a moving lateral seal for separating gas and fluid, and said follower portion coacting with the junction fitting to form an end seal to prevent escape of gas from said body once said fluid is discharged from said body.

8. A free piston hydropneumatic accumulator comprising a body portion of tubing having a length-to-diameter ratio of at least 50 to 1, said body portion being formed into straight portions and smoothly curved portions, a closure at one end of said body portion, a gas-filling valve in said closure, a junction fitting at the other end of said body portion, and a free piston having an annular resilient seal of limited axial length to the inside wall of said body for separating the gas and fluid within said body portion.

9. A free piston hydropneumatic accumulator comprising a length of tubing having a length-to-diameter ratio of at least 50 to 1, said tubing being formed into a helix with smoothly curved portions, closed at one end and having a junction fitting at the other end, and a free piston for separating the gas and fluid within said body and movable intermediate the ends thereof through said curved portions.

10. A free piston hydropneumatic accumulator comprising a body portion of tubing having a length-to-diameter ratio of at least 50 to 1, said body portion being formed into straight portions and smoothly curved portions, a closure at one end of said body portion, a gas-filling valve in said closure, a junction fitting at the other end of said body portion, and a free piston having an annular resilient seal of limited axial length to the inside wall of said body for separating the gas and fluid within said body portion, said piston having a relatively stiff but resilient end portion engageable with said junction fitting to constitute an end seal.

No references cited.